US012744949B2

(12) United States Patent
Guery et al.

(10) Patent No.: US 12,744,949 B2
(45) Date of Patent: Sep. 22, 2026

(54) METHOD FOR DELIVERING AN AUDIO AND/OR VIDEO CONTENT AND TRANSCODING PROXY IMPLEMENTING SAID METHOD

(71) Applicant: BROADPEAK, Cesson Sevigne (FR)

(72) Inventors: Pierre-Jean Guery, Cesson Sevigne (FR); Vincent Richard, Cesson Sevigne (FR); Dylan Gageot, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 0 days.

(21) Appl. No.: 19/136,755

(22) PCT Filed: Dec. 14, 2023

(86) PCT No.: PCT/EP2023/085810
§ 371 (c)(1),
(2) Date: Jun. 6, 2025

(87) PCT Pub. No.: WO2024/132841
PCT Pub. Date: Jun. 27, 2024

(65) Prior Publication Data

US 2026/0205639 A1 Jul. 16, 2026

(30) Foreign Application Priority Data

Dec. 20, 2022 (EP) .................................... 22306960

(51) Int. Cl.
*H04N 21/2343* (2011.01)
*H04N 21/222* (2011.01)
(Continued)

(52) U.S. Cl.
CPC . *H04N 21/234309* (2013.01); *H04N 21/2223* (2013.01); *H04N 21/23424* (2013.01); *H04N 21/84* (2013.01); *H04N 21/8547* (2013.01)

(58) Field of Classification Search
CPC ......... H04N 21/44016; H04N 21/8456; H04N 21/26258; H04N 21/23439
See application file for complete search history.

(56) References Cited

U.S. PATENT DOCUMENTS

2012/0265901 A1* 10/2012 Swenson ........ H04N 21/234309 709/246
2014/0150019 A1* 5/2014 Ma ....................... H04N 21/458 725/34
(Continued)

FOREIGN PATENT DOCUMENTS

GB 2499539 A 8/2013
WO 2019/088853 A1 5/2019
WO 2022/094108 A1 5/2022

OTHER PUBLICATIONS

Feb. 19, 2024 International Search Report and Written Opinion issued in International Application No. PCT/EP2023/085810.

*Primary Examiner* — Jason Salce
(74) *Attorney, Agent, or Firm* — Williams Mullen; R. Brian Drozd

(57) ABSTRACT

An A/V content that includes a primary A/V content and a secondary A/V content to be inserted in the primary A/V content is delivered to a client device using adaptive streaming. A transcoding proxy enables transcoding segments of the secondary A/V content, when the segments of the secondary A/V content have different duration than a typical duration of the segments of the primary A/V content. The transcoding rewrites an original secondary A/V content manifest by indicating, in a part thereof intended to be reused by the client device to request segments of the secondary A/V content, that transcoding is requested, by indicating the typical duration of the segments of the primary A/V content, and by modifying a description of said at least one representation of the secondary A/V content, both
(Continued)

to match a rewritten timeline aligned on the typical duration of the segments of the primary A/V content.

11 Claims, 7 Drawing Sheets

(51) Int. Cl.

| | |
|---|---|
| ***H04N 21/234*** | (2011.01) |
| ***H04N 21/84*** | (2011.01) |
| ***H04N 21/8547*** | (2011.01) |

(56) References Cited

U.S. PATENT DOCUMENTS

| | | | | |
|---|---|---|---|---|
| 2014/0359081 | A1* | 12/2014 | Van Deventer | H04L 67/63<br>709/219 |
| 2021/0014578 | A1* | 1/2021 | Schildbach | H04L 67/565 |
| 2021/0297709 | A1 | 9/2021 | Reitmeyer | |
| 2023/0107968 | A1* | 4/2023 | Trivedi | G09B 19/06<br>434/157 |

* cited by examiner

METHOD FOR DELIVERING AN AUDIO AND/OR VIDEO CONTENT AND TRANSCODING PROXY IMPLEMENTING SAID METHOD

TECHNICAL FIELD

At least one embodiment generally relates to a method for delivering an audio and/or video content to a client device using adaptive streaming by an audio and/or video content delivery system deployed on top of a network infrastructure. At least one embodiment relates to a transcoding proxy configured to implement the method.

RELATED ART

Various protocols have been developed to address adaptive streaming services. HLS (standing for "HTTP Live Streaming", which is a live streaming communications protocol based on HTTP (standing for "Hypertext Transfer Protocol") and developed by Apple Inc.) and DASH (standing for "Dynamic Adaptive Streaming over HTTP", which is a multimedia streaming technology developed by the Moving Picture Experts Group (MPEG)) are examples of such protocols. All these protocols are based on an adaptive transmission concept based on HTTP, namely HTTP Adaptive Streaming (HAS).

In HAS, a client device (or terminal) interacts with a delivery platform, typically via a Content Delivery Network (CDN), for requesting segments of an audio and/or video (referred to as A/V in the following) content to be played out. To this aim, each A/V content is encoded in a plurality of representations, namely with various resolutions and/or various bitrates and/or various codecs.

The representations are time-aligned per segment and start with the same A/V reference frame. This makes it possible for the client device, and more particularly for an A/V player included therein, to switch from one representation to another representation on segment boundaries, for example to adapt to variations in network bandwidth while optimizing user experience.

For each A/V content, at least one text file, called manifest, is created which describes the A/V content, with its various representations, and how said A/V content can be accessed. For obtaining and playing an A/V content, the client device sends a request to the delivery platform in order to get the one or more manifests associated with that particular A/V content. After receiving the one or more manifests, the client device parses the one or more manifests, selects a suitable representation and then starts requesting specific segments of the A/V content in order to receive said segments and play the A/V content (typically using a built-in player). The requested representation is suitably selected depending on transmission conditions, using typically information such as buffer size and buffer filling rate, as well as available bandwidth.

While delivering a primary A/V content, in some situations, at least one secondary A/V content may have to be inserted at respectively at least one predefined instant in the primary A/V content. For example, in order to monetize these A/V contents for both live and video on demand, streaming companies implement server-side ad insertion (SSAI). Other types of A/V contents can be dynamically inserted in the same way, such as public alerting A/V messages or information in A/V form complementing the primary A/V content. Such secondary A/V content can also be breaking news during live streaming.

Traditionally, considering ad insertion scenarios, video ads had been managed on client devices' side, more particularly by players. This solution is referred to as CSAI (standing for "Client-Side Ad Insertion"). However, CSAI has an impact on user's experience, since it can cause rebuffering between the ad and the A/V content (primary A/V content) that was being played. It also creates a possibility of using ad blockers (which may be damageable in the case where a public alerting A/V message is blocked as being detected as an unsolicited ad). Therefore, SSAI solution is now preferred, since the ad (or other type of secondary A/V content) is directly included in the stream coming from the CDN. Consequently, no rebuffering and secondary A/V content blocking (such as ad blocking) is possible.

SSAI comprises modifying the primary A/V content on the server side to insert ads (secondary A/V content) at specified ad breaks, or positions, in the primary A/V content. More precisely, when the client device is about to reach an ad break, the delivery platform transmits an ad request to an ad server. The ad server chooses which ad to show to the end-user and sends the chosen ad, or information representative thereof, back to the delivery platform. The delivery platform is then responsible to stitch the selected ad (secondary A/V content) into the primary A/V content, which is then provided to the client device, typically via the CDN.

Contrary to the primary A/V contents, the ads are usually packaged in files (such as mp4 files) with only one representation. And, whereas the primary A/V contents are made for adaptive streaming and therefore trimmed into segments of typical duration (e.g., 2 seconds), the ads (secondary A/V content) are trimmed into segments of various durations, for example according to GoP (standing for "Group of Pictures") boundaries.

Consequently, an ad (secondary A/V content) segment can last more than a primary A/V content segment typical duration (e.g., 2 seconds), according to which a receiving buffer size has been setup for the player. It can cause the player to hang on when receiving an ad (secondary A/V content) segment having a duration longer than the typical duration of the segments of the primary A/V content, since it exceeds the segment duration that has been used to define the receiving buffer size.

In addition, having only one representation is not compliant with adaptive streaming, since it does not make it possible for the client device (or terminal) to switch from one representation to another representation on ad (secondary A/V content) segment boundaries, for example to adapt to variations in bandwidth on the network.

There is thus a need for a method for delivering an A/V content to a terminal (or more generally, to a client device) using adaptive streaming that prevents the player to hang on when the secondary A/V content (such as an ad) has to be inserted in the primary A/V content.

SUMMARY OF THE INVENTION

It is proposed herein a method for delivering an audio and/or video A/V content to a client device using adaptive streaming by an A/V content delivery system, the A/V content comprising a primary A/V content and a secondary A/V content to be inserted in the primary A/V content, the primary A/V content and the secondary A/V content being in a form of segments, the method being implemented by a transcoding proxy of the A/V content delivery system, wherein the method comprises:

receiving a first request for preparing to transcoding segments of the secondary A/V content, when the segments of the secondary A/V content have different duration than a typical duration of the segments of the primary A/V content, the first request including locator information about an original secondary A/V content manifest along with configuration parameters, said configuration parameters comprising the typical duration of the segments of the primary A/V content;

obtaining said original secondary A/V content manifest using the locator information about the original secondary A/V content manifest, which describes an original secondary A/V content segments timeline and at least one available representation of original secondary A/V content associated with said original secondary A/V content segments timeline;

rewriting said original secondary A/V content manifest, so as to obtain a rewritten secondary A/V content manifest, by indicating, in a part thereof intended to be reused by the client device to request segments of the secondary A/V content, that transcoding is requested as well as the typical duration of the segments of the primary A/V content, and by modifying the description of said at least one representation so as to match a rewritten timeline obtained by rewriting the original secondary A/V content segments timeline responsive to the received configuration parameters so that the rewritten segment timeline is aligned on the typical duration of the segments of the primary A/V content;

transmitting the rewritten secondary A/V content manifest in response to the first request;

and when receiving a second request for at least one segment of the secondary A/V content according to the rewritten secondary A/V content manifest, instructing a transcoder to perform transcoding operations so as to obtain, and further transmit in response to the second request, segments of the secondary A/V content according to the rewritten timeline.

Thus, the transcoding operations avoid that a player of the client device hang on when the secondary A/V content (such as an ad) has to be inserted in the primary A/V content, although the segments of the secondary A/V content have different duration than a typical duration of the segments of the primary A/V content. Rewriting the original secondary A/V content manifest as recited above further enables the transcoding proxy to operate in a stateless manner, which therefore provides efficient inclusion of the transcoding operations during the A/V delivery.

According to a particular embodiment, said configuration parameters further comprise information about at least one representation to be made available for the secondary A/V content, and modifying said original secondary A/V content manifest further comprises adding a description of said at least one new representation indicating that transcoding is requested to match the rewritten timeline.

Thus, Quality of Experience (QoE) is improved since the secondary A/V content is more smoothly inserted in the adaptive streaming in view of available resolutions (representations) of the primary A/V content.

According to a particular embodiment, said adaptive streaming is compliant with Motion Picture Expert Group Dynamic Adaptive Streaming over Hypertext transfer protocol MPEG DASH, the second request includes a timestamp information <timestamp> indicating one segment of the secondary A/V content to be obtained, and performing the transcoding operations comprises:

computing start and stop encoding timestamps as:

<start encoding timestamp>=<timestamp>

<stop encoding timestamp>=<timestamp>+<target-duration> determining at least one original A/V secondary content segment to be used in the transcoding operation, as:

start timestamp, which represents a start of decoding of the original A/V secondary content, and which is a segment boundary less than or equal to <start encoding timestamp>, and end timestamp, which represents a stop of decoding of the original A/V secondary content, and which is a segment boundary greater than or equal to <stop encoding timestamp> downloading each original A/V secondary content segment between start timestamp and end timestamp, and performing decoding segments between start timestamp and end timestamp;

reencoding one segment between start encoding timestamp and stop encoding timestamp; and transmitting the reencoded segment in response to the second request.

Thus, the transcoding operations are efficiently performed within MPEG DASH context.

According to a particular embodiment, said adaptive streaming is compliant with Hypertext transfer protocol Live Streaming HLS, the second request includes identification of at least one segment of the secondary A/V content according to the original secondary A/V content segments timeline which is needed to obtain the at least one segment of the secondary A/V content as requested by the second request.

Thus, the transcoding operations are efficiently performed within HLS context.

According to a particular embodiment, rewriting said original secondary A/V content manifest further comprises adding in the rewritten secondary A/V content manifest, in the part thereof intended to be reused by the client device to request segments of the secondary A/V content, the locator information about the original secondary A/V content manifest. And when receiving the second request, the transcoding proxy retrieves the information about the original secondary A/V content using the original secondary A/V content manifest pointed by said locator information.

Thus, stateless transcoding is efficiently achieved.

It is further proposed herein a computer program product comprising instructions causing implementation of the method recited above in any one of its embodiments, when the instructions are executed by a processor. It is further proposed herein a non-transitory storage medium storing instructions causing implementation of said method, when the instructions are read from the storage medium and executed by a processor.

According to a particular embodiment, delivering segments of the A/V content to the client device is performed by an A/V delivery platform, and the A/V delivery platform performs:

retrieving, from a primary A/V contents server that provides the primary A/V content, an original primary A/V content manifest;

detecting that the primary A/V content has to be complemented by insertion of the secondary A/V content thanks to specific markers in the original primary A/V content manifest;

sending the first request to the transcoding proxy; and modifying the original primary A/V content manifest using the rewritten secondary A/V content manifest so as to obtain a rewritten primary A/V content manifest including information for inserting the secondary A/V content;

transmitting the rewritten primary A/V content manifest to the client device in response to a request for obtaining the original primary A/V content manifest.

Thus, insertion of the A/V secondary content in the primary A/V content delivery is efficiently achieved.

According to a particular embodiment, the second request is transmitted by the A/V delivery platform or by equipment of a Content Delivery Network CDN via which the A/V delivery platform delivers the A/V content to the client device.

According to a particular embodiment, the A/V delivery platform or said equipment of the CDN performs:

- receiving from the client device a request for obtaining a segment of the A/V content;
- determining whether the segment in question is a primary A/V content segment or a secondary A/V content segment;
- when the segment in question is a primary A/V content segment, obtaining the segment in question from the primary A/V contents server;
- when the segment in question is a secondary A/V content segment that does not need transcoding, obtaining the segment in question from a secondary A/V contents server; and
- when the segment in question is a secondary A/V content segment that does not need transcoding, sending the second request to the transcoding proxy.

It is further proposed herein a transcoding proxy intended to be used in an audio and/or video A/V content delivery system for delivering an A/V content to a client device using adaptive streaming, the A/V content comprising a primary A/V content and a secondary A/V content to be inserted in the primary A/V content, the primary A/V content and the secondary A/V content being in a form of segments, the transcoding proxy comprising electronic circuitry configured to perform:

- receiving a first request for preparing to transcoding segments of the secondary A/V content, when the segments of the secondary A/V content have different duration than a typical duration of the segments of the primary A/V content, the first request including locator information about an original secondary A/V content manifest along with configuration parameters, said configuration parameters comprising the typical duration of the segments of the primary A/V content;
- obtaining said secondary A/V content original manifest using the locator information about the original secondary A/V content manifest, which describes an original secondary A/V content segments timeline and at least one available representation of said original secondary A/V content associated with said original secondary A/V content segments timeline;
- rewriting said original secondary A/V content manifest, so as to obtain a rewritten secondary A/V content manifest, by indicating, in a part thereof intended to be reused by the client device to request segments of the secondary A/V content, that transcoding is requested as well as the typical duration of the segments of the primary A/V content; and by modifying the description of said at least one representation so as to match a rewritten timeline obtained by rewriting the original secondary A/V content segments timeline responsive to the received configuration parameters so that the rewritten segment timeline is aligned on the typical duration of the segments of the primary A/V content;
- transmitting the rewritten secondary A/V content manifest in response to the first request;
- and when receiving a second request for at least one segment of the secondary A/V content according to the rewritten secondary A/V content manifest, instructing a transcoder to perform transcoding operations so as to obtain, and further transmit in response to the second request, segments of the secondary A/V content according to the rewritten timeline.

It is further proposed herein an audio and/or video content delivery system comprising a Content Delivery Network CDN via which audio and/or video contents are delivered to client devices, further comprising the transcoding proxy as recited above.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF AT LEAST ONE EMBODIMENT

Figure 1:
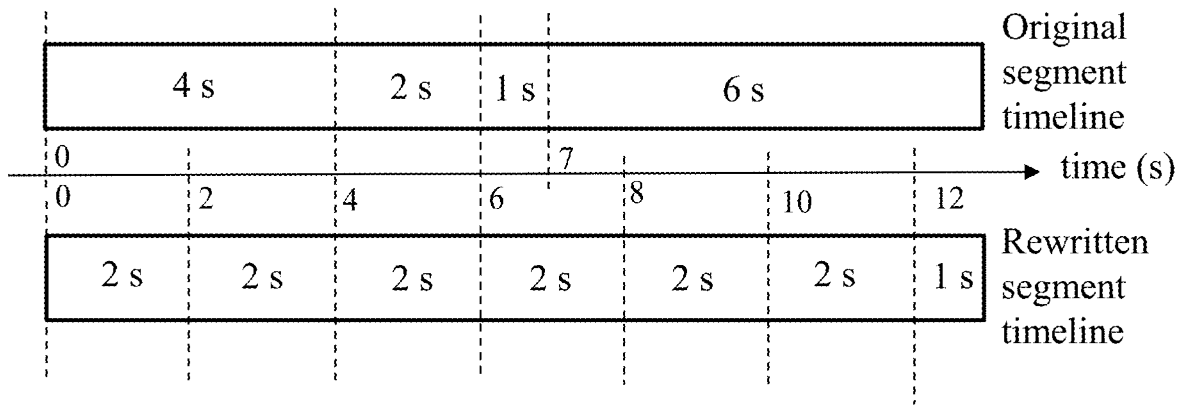
FIG. 1 schematically represents an original secondary A/V content segment timeline with four segments of various durations and a corresponding rewritten timeline.

FIG. 1 schematically represents segments of a secondary A/V (audio and/or video) content to be inserted in a primary A/V (audio and/or video respectively) content. At the top of FIG. 1, four segments of various durations illustratively compose an original form of the secondary A/V content according to an original timeline. At the bottom of FIG. 1, seven segments of harmonized durations illustratively compose a transcoded form of the secondary A/V content according to a rewritten timeline.

A client device requests, to an A/V delivery platform, delivery of the primary A/V content to the client device. The A/V delivery platform has to manage adequate insertion of the secondary A/V content in the primary A/V content at specified instants, namely at specified positions in an A/V content segments timeline. Since the A/V content data that have been requested by the client device are relative to the primary A/V content, the client device has been configured relatively to characteristics of the primary A/V content.

Typically, in live streaming, the secondary A/V content is not even known when delivery of the primary A/V content to the client device starts.

More particularly, in order to enable adaptive streaming, the primary A/V content is delivered in a form of successive segments having a typical duration. Typical duration means that, as far as possible, the duration of each segment equals the typical duration (e.g., 2 seconds). The duration of some segments may be shorter than the typical duration in some situations, namely when the segment in question is a last segment before a switch to another A/V content or before the end of the A/V content delivery to the client device. The segments duration shall however not exceed the typical duration.

The client device includes a receiving buffer to store A/V contents segments received from the A/V delivery platform. The depth (or size) of the receiving buffer is defined at least according to the typical duration of the segments of the primary A/V content. Therefore, providing to the client device segments having a longer duration than the typical duration of the segments of the primary A/V content may make the client device (more particularly a built-in player) hanging on or generate an overflow of the receiving buffer, since the receiving buffer depth (or size) is not adequately defined for handling such segment duration.

Contrary to the primary A/V contents, the secondary A/V content (such as ads) are typically provided by an external provider. The secondary A/V contents are typically used by different A/V delivery platforms or information systems and are not designed following same constraints as A/V contents (primary A/V contents) usually delivered by the A/V delivery platform. More particularly, the secondary A/V contents are made of segments of various durations.

Illustratively, at the top of FIG. 1, a timeline of secondary A/V content segments, comprising four segments of respective duration of 4 s (second), 2 s, 1 s and 6 s is represented. It therefore comprises segments of various durations and is referred to as original secondary A/V content timeline. As indicated before, the segments of duration 4 s and 6 s may make the player of the client device to hang on. Therefore, there is a need to modify the secondary A/V content segments and their corresponding timeline so that the duration of the modified secondary A/V content segments matches the typical duration of the segments of the primary A/V content, as illustrated at the bottom of FIG. 1. Doing so thus improves quality of experience (QoE).

The secondary A/V content is accompanied by a secondary A/V content manifest, which provides information about the secondary A/V content, such as information (such as URL (standing for "Uniform Resource Locator")) indicating where to obtain the original form of the secondary A/V content, and which further provides the original timeline of the secondary A/V content. The secondary A/V content manifest accompanying the secondary A/V content manifest in its original form is herein referred to as original secondary A/V content manifest.

Consequently, the original secondary A/V content manifest needs to be rewritten so as to obtain a rewritten secondary A/V content manifest that describes a harmonized segment layout in line with the typical duration of the primary A/V content segments, i.e., a rewritten segments timeline that is aligned on the typical duration of the primary A/V content segments.

As illustrated at the bottom of FIG. 1, the rewritten segments timeline shows six segments of 2 s duration each and one last segment of 1 s duration. Since the secondary A/V content segments timeline has to be modified, the corresponding description in the secondary A/V content manifest needs to be rewritten in accordance.

In order to match the rewritten timeline, the segments of the original secondary A/V content have to be transcoded according thereto. Indeed, modifying the timeline modifies A/V stream structure, namely for video data the position of the I frames and thus GoP structure.

Optionally, when rewriting the secondary A/V content manifest, information about additional representations may further be added, and corresponding segments may be generated in accordance, so as to enable or improve adaptive streaming for the secondary A/V content delivery.

The rewritten secondary A/V content manifest enables stateless on-the-fly transcoding of the secondary A/V content. Once transcoded, the secondary A/V content can be inserted in the primary A/V content when delivering A/V content data to the client device. Player hang-on and/or receiving buffer overflow is thus avoided.

Figure 2:
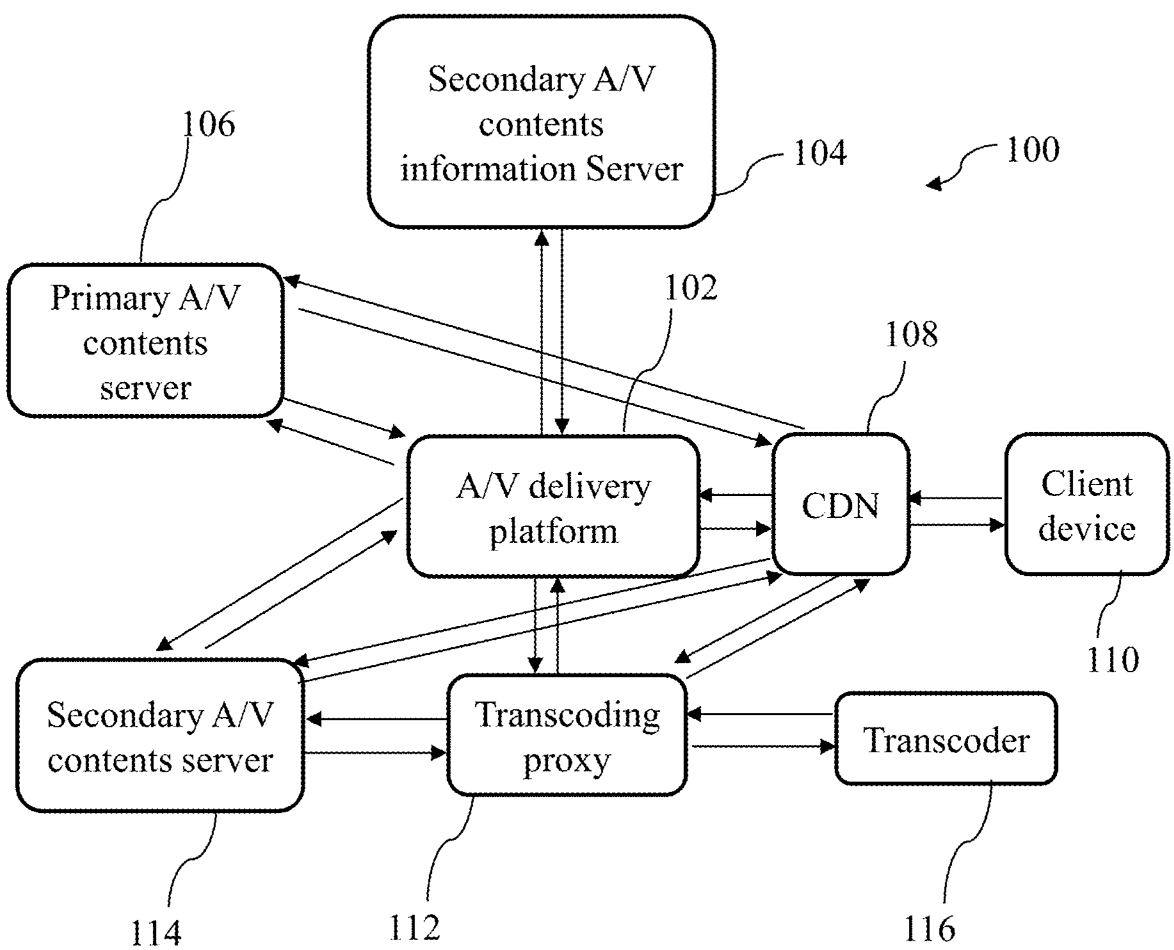
FIG. 2 schematically represents an A/V content delivery system deployed on top of a network infrastructure.

FIG. 2 schematically represents an A/V content delivery system 100 deployed on top of a network infrastructure, in a particular embodiment.

The A/V content delivery system 100 comprises an A/V delivery platform 102 in communication with a secondary A/V content information server 104. The A/V delivery platform 102 is responsible for, and configured for, delivering A/V content (e.g., live A/V content or VOD (standing for "Video-on-Demand")) from different sources to one or more client devices 110 (e.g., a desktop or laptop, a TV, a Set-Top Box, a tablet or a smartphone), preferably through a CDN 108.

In a preferred embodiment, the secondary A/V content information server 104 is managed by another operator (company) than the A/V delivery platform 102. It means that the A/V delivery platform 102 and the secondary A/V content information server 104 are managed independently, and that the secondary A/V content information server 104 is not designed and configured for providing information about secondary A/V contents that are specifically made by taking into account constraints of a primary A/V contents server 106 (from which primary A/V contents segments and manifests are obtained), such as the typical duration of A/V segments to be delivered.

The A/V content delivery system 100 further comprises a transcoding proxy 112 and a transcoder 116. The transcoding proxy 112 is configured and used to coordinate transcoding operations so that the A/V delivery platform 102 is able to deliver harmonized A/V contents data and manifest to the client devices 110, while the transcoder 116 is configured to effectively perform the transcoding operations on A/V contents media.

The transcoder 116 may be made using ephemeral transcoding functions, e.g., deployed on-the-fly in a cloud infrastructure. In this case, one ephemeral transcoding function is instantiated when transcoding operations are specifically needed (instead of being continuously instantiated).

During operation, the client device 110 initiates an adaptive streaming session, by sending a request (typically, an HTTP request) for receiving a manifest associated with a desired A/V content to equipment of the CDN 108 which in turn, if the A/V content is not already cached by the CDN 108, forwards the request to the A/V delivery platform 102. The client device 110 may initiate the adaptive streaming session directly with the A/V delivery platform 102, namely without having recourse to the CDN 108.

One may note that the client device 110 may also request receiving a manifest associated with a desired A/V content at other instants during streaming operations, especially in case of live streaming.

The desired A/V content is a primary A/V content, which has to be complemented by insertion of a secondary A/V content that may not be harmonized in its segments form with the primary A/V content. In one embodiment, the secondary A/V content is ad.

The A/V delivery platform detects that the primary A/V content has to be complemented by insertion of the secondary A/V content thanks to specific markers in the manifest associated with the primary A/V contents. The A/V delivery platform 102 retrieves, from a primary A/V contents server 106, said primary A/V content manifest corresponding to the desired primary A/V content. Said manifest is herein referred to as original primary A/V content manifest.

The A/V delivery platform 102 is configured to modify the original primary A/V content manifest so as to obtain a rewritten primary A/V content manifest including information for inserting the secondary A/V content in the A/V data delivered to the client device 110. To this aim, the A/V delivery platform 102 is configured to send a request to the secondary A/V content information server 104 to receive a list of at least one A/V secondary content to be inserted in the A/V content data to be delivered to the client device 110 and to obtain in response an original secondary A/V content manifest including secondary A/V content locator information (typically, URL).

In an exemplary embodiment, the A/V delivery platform 102, when detecting one said specific marker, such an ad break marker, in the original primary A/V content manifest, sends a VAST (acronym of “Video Ad Serving Template”) or VMAP (acronym of “Video Multiple Ad Playlist”) request to the secondary A/V content information server 104, which is an ad server in the exemplary embodiment. The secondary A/V content information server 104 responds to the A/V delivery platform 102 by sending a VAST or VMAP response. The VAST/VMAP response comprises the original secondary A/V content manifest, namely an ad content manifest with an ad content locator. For example, in case of live streaming, the ad break marker may be signalled using the SCTE35 (“Society of Cable and Telecommunications Engineers”) protocol in the original primary A/V content and the primary A/V contents server 106 inserts corresponding ad break marker in the original primary A/V content manifest.

The A/V delivery platform 102 is configured to check whether the original timeline of the secondary A/V content segments, as indicated in the original secondary A/V content manifest, matches the typical duration of the primary A/V content segments, as indicated in the primary A/V content manifest. If this is the case, the A/V delivery platform 102 is further configured to manipulate the original primary A/V content manifest to insert therein, in place of the aforementioned specific markers (such as ad breaks), the original secondary A/V content manifest, and to thus obtain the rewritten primary A/V content manifest. Otherwise, the A/V delivery platform 102 is configured to use the transcoding proxy 112 to obtain the rewritten secondary A/V content manifest with a rewritten timeline matching the typical duration of the primary A/V content segments.

In a preferred embodiment, the A/V delivery platform 102 is configured to check whether the original secondary A/V content manifest includes the same representations as in the original primary A/V content manifest. If not, the A/V delivery platform 102 is configured to use the transcoding proxy 112 to modify the secondary A/V content manifest for indicating availability of the same representations as in the original primary A/V content manifest, according to a timeline (potentially a rewritten timeline) matching the typical duration of the primary A/V content segments.

To this aim, the A/V delivery platform 102 is configured to send a request to the transcoding proxy 112 to prepare for transcoding. The request includes locator information about the original secondary A/V content manifest, in order for the transcoding proxy 112 to further obtain locator information about the secondary A/V content segments, as well some parameters including the typical duration of the segments of the primary A/V content. The parameters of said request may include an indication of the representations of the secondary A/V content to be provided. Except otherwise stated in said request, the representation(s) of the secondary A/V content to be provided is (are) the one(s) of the original secondary A/V content manifest.

The transcoding proxy 112 is configured to modify in accordance the original secondary A/V content manifest so as to obtain the rewritten secondary A/V content manifest according to the timeline matching the typical duration of the primary A/V content segments. The transcoding proxy 112 is configured to include in the rewritten secondary A/V content manifest an indication that the manifest in question is associated with transcoding operations and all necessary information to perform the transcoding operations in a stateless manner. The indication that the manifest in question is associated with transcoding operations is added in a part of the rewritten secondary A/V content manifest which is intended to be reused by the client device 110 when requesting segments of the secondary A/V content. The transcoding proxy 112 is configured to then respond to the A/V delivery platform 102 with the rewritten secondary A/V content manifest. The A/V delivery platform 102 is further configured to manipulate the original primary A/V content manifest to insert therein, in place of or in addition to the aforementioned specific markers (such as ad breaks), information extracted from the rewritten secondary A/V content manifest as received from the transcoding proxy 112, and to thus obtain the rewritten primary A/V content manifest. For example, with MPEG DASH, a new period is created/inserted in the original primary A/V content manifest and new adaptation set description is copied therein from the rewritten secondary A/V content manifest as received from the transcoding proxy 112. For example, with HLS, the original primary A/V content manifest (playlist) is modified with new set of segments declarations copied from the rewritten secondary A/V content manifest as received from the transcoding proxy 112.

The A/V delivery platform 102 is further configured to then transmit the rewritten primary A/V content manifest to the client device 110.

During streaming operation, the client device 110 requests A/V content segments according to the rewritten primary A/V content manifest. Doing so, the client device 110 includes in the respective request information quoted from the rewritten primary A/V content manifest. When a requested segment corresponds to a primary A/V content segment, the CDN 108 may forward the request directly to the primary A/V contents server 106 for further serving the client device 110. Alternatively, the request may reach the A/V delivery platform 102 that is configured to obtain said segment from the primary A/V contents server 106 and to transmit the obtained segment to the client device 110. When a requested segment corresponds to a secondary A/V content segment that does not need transcoding, the CDN 108 may forward the request directly to a secondary A/V contents server 114, where the segments of the original secondary A/V content in question are stored (located). Alternatively, the request may reach the A/V delivery platform 102 that is configured to obtain said segment from the secondary A/V contents server 114, and to transmit the obtained segment to the client device 110. When a requested segment corresponds to a secondary A/V content segment that needs transcoding, the CDN 108 may forward the request directly to the transcoding proxy 112 for performing on-the-fly transcoding operations. Alternatively, the request can reach the A/V delivery platform 102 that is configured to use the transcoding proxy 112 for performing the on-the-fly transcoding operations.

To this aim, the CDN 108 (equipment thereof) and the A/V delivery platform 102 are configured to detect that the client device 110 requests a secondary A/V content segment, and to further detect whether said secondary A/V content segment needs transcoding thanks to the presence, in the request coming from the client device 110, of the transcoding indication that was included in the rewritten primary A/V content manifest (e.g., the transcoding indication is ensured using a specific keywork, such as "normalized"). The CDN 108 and the A/V delivery platform 102 are configured to consequently forward the request in question to the transcoding proxy 112. The transcoding proxy 112 is configured to obtain, from the forwarded request, information indicating where (locator information) to find the original secondary A/V content manifest, which in turn provides information about where (locator information) to find original secondary A/V content segment(s). The transcoding proxy 112 is configured to then request the needed original secondary A/V content segment(s) to the secondary A/V contents server 114, and to instruct the transcoder 116 to perform the necessary transcoding operations so as to match the typical duration of the segments of the primary A/V content. Once done, the transcoding proxy 112 is configured to return the transcoded secondary A/V content segment(s) to the A/V delivery platform 102 or directly to the CDN 108 for further delivery to the client device 110.

When present, the CDN 108 may cache the segments provided by the transcoding proxy 112 or by the A/V delivery platform 102 so as to speed up delivery of corresponding A/V content data to the client device (i.e., without requiring another time that the A/V delivery platform 102, and potentially the transcoding proxy 112 and the transcoder 116, to intervene).

One should note that it is assumed in FIG. 2 that the A/V delivery platform 102 is external to the CDN 108. This is only one arrangement among a plurality of suitable arrangements. One understands that an equipment of the CDN 108 (with a dedicated function or set of functions implemented therein), such as a cache server or a request router, may act as the A/V delivery platform 102. Furthermore, as already mentioned, the client device 110 may communicate with the A/V delivery platform 102 without having recourse to a CDN.

Figure 3:
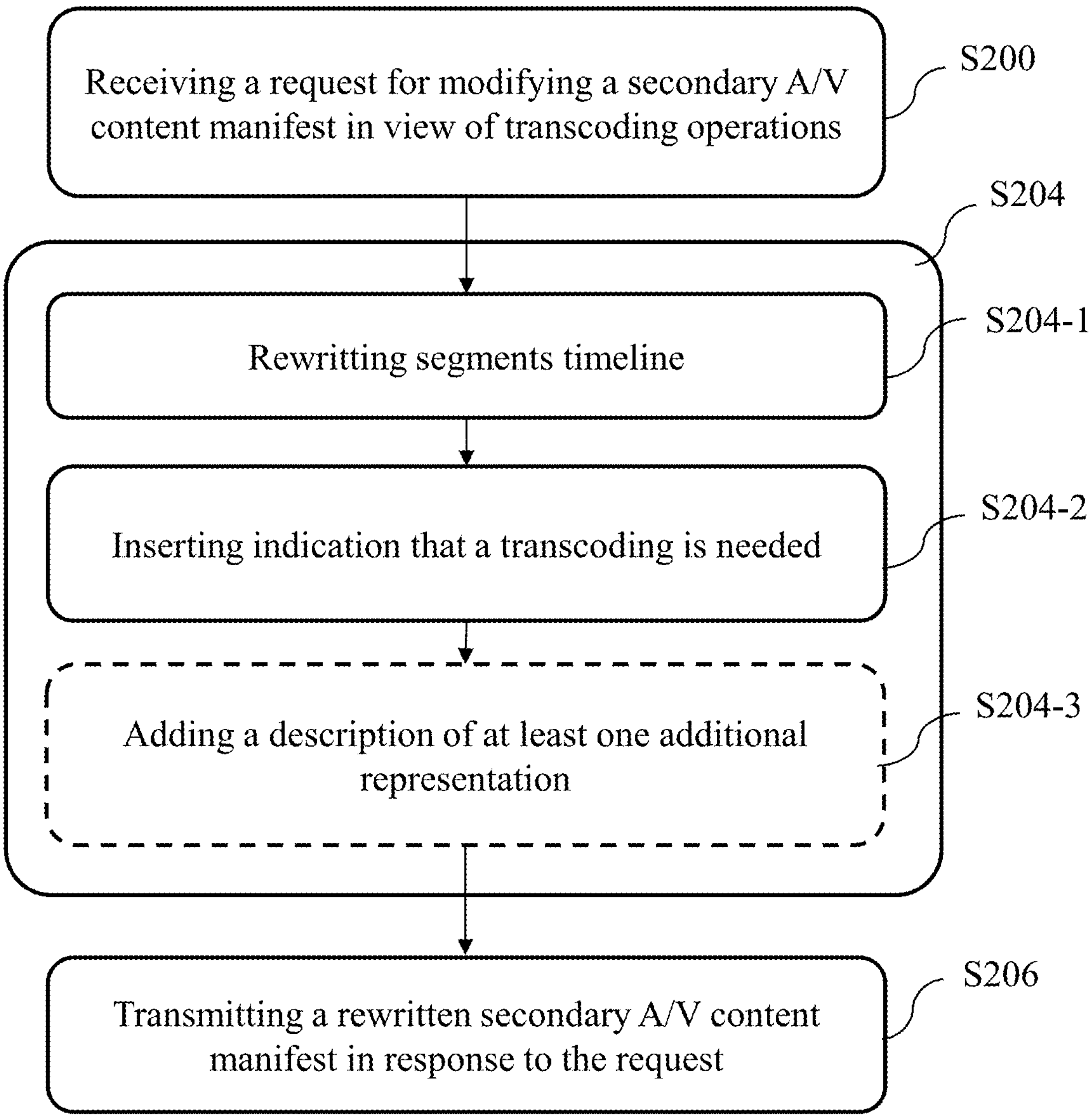
FIG. 3 schematically represents a flowchart of a method for rewriting a secondary A/V content manifest, according to a particular embodiment.

FIG. 3 schematically represents a flowchart of a method for rewriting a secondary A/V content manifest according to a particular embodiment. Rewriting the secondary A/V content manifest makes it possible to align the timeline of the segments of the secondary A/V content on the typical duration of the segments of a primary A/V content and optionally further add one or more representations. Moreover, rewriting the secondary A/V content manifest enables inserting information and parameters enabling the transcoding proxy 112 to operate in a stateless manner (i.e., without having to store past history information).

In a step S200, the transcoding proxy 112 receives a request for transforming an original secondary A/V manifest associated with an original secondary A/V content from the A/V delivery platform 102. The request includes configuration parameters comprising at least locator information (typically, URL) about the original secondary A/V manifest, the typical duration of segments and possibly information (e.g., corresponding to additional codec/bitrate/resolution) describing new representations to be added.

In a step S204, the transcoding proxy 112 modifies the original secondary A/V content manifest so as to obtain a rewritten secondary A/V content. To this aim, in a step S204-1, the transcoding proxy 112 rewrites the segment timeline described in the original secondary A/V content manifest according to the configuration parameters included in the received request so that the rewritten segment timeline matches the typical duration of the segments of the primary A/V content in which the secondary A/V content has to be inserted. As already mentioned, the last segment may possibly be of a different duration in the case where the whole duration of the secondary A/V content is not a multiple of said typical duration.

As an example, in the case of an MPEG DASH manifest, the following portion of an original ad manifest (left column of the table below) describing the timeline represented at the top of FIG. 1 is rewritten as indicated in the right column, assuming a request including the following configuration parameters: typical duration of 2 s and one additional representation defined by bandwidth="1000000" codecs="avc1.4d0020" width="1280" height="720">:

| Portion of original secondary A/V content manifest | Portion of rewritten secondary A/V content manifest |
| --- | --- |
| <AdaptationSet ...><br><BaseURL>dash/</BaseURL><br><SegmentTemplate<br>initialization="$RepresentationID$.mp4"<br>media="$RepresentationID$-$Time$.m4s"<br>timescale="90000"><br><SegmentTimeline><br><S t="0" d="360000"/><br><S d="180000"/><br><S d="90000"/><br><S d="540000"/><br></SegmentTimeline><br></SegmentTemplate><br><Representation id="video=8000000"<br>bandwidth="8000000" | <AdaptationSet ...><br><BaseURL>normalized_<link-to-original-mpd>_<target-duration>/</BaseURL><br><SegmentTemplate<br>initialization="$RepresentationID$.mp4"<br>media="RepresentationID$-$Time$.m4s"<br>timescale="90000"><br><SegmentTimeline><br><S t="0" r="5" d="180000"/><br><S d="90000"/><br></SegmentTimeline><br></SegmentTemplate><br><Representation id="jitt=8000000-1920x1080-srcvideo=8000000"<br>bandwidth="8000000" |

-continued

| Portion of original secondary A/V content manifest | Portion of rewritten secondary A/V content manifest |
|---|---|
| codecs="avc1.4d0020" width="1920" height="1080"></Representation> </AdaptationSet> ... | codecs="avc1.4d0020" width="1920" height="1080"></Representation> <Representation id="jitt=1000000-1280x720-srcvideo=8000000" bandwidth="1000000" codecs="avc1.4d0020" width="1280" height="720"></Representation> </AdaptationSet> ... |

The manifest is thus rewritten in such a way that the URL attached to any request for obtaining an individual segment of the secondary A/V content which is possibly submitted by the client device 110 carries necessary information for the transcoding proxy 112. Therefore, the indication that the manifest in question is associated with transcoding operations is added in a part of the rewritten secondary A/V content manifest which is intended to be reused by the client device 110 when requesting segments of the secondary A/V content.

More precisely, in the example above, a base URL is modified by using the prefix (keyword) "normalized" in order to indicate that requests for segments of the secondary A/V content (during streaming) are to be processed by the transcoding proxy 112 and that transcoding operations have to be performed. The modified base URL further comprises a path <link-to-original-mpd> enabling the transcoding proxy 112 to fetch the original secondary A/V content manifest. As already indicated, the path (locator information) of the original secondary A/V content manifest has been provided by the A/V delivery platform 102 to the transcoding proxy 112. Finally, the rewritten secondary A/V content manifest comprises an indication of the typical duration (e.g., 2 s) to be applied, i.e., where <target-duration> is indicated in the example above.

According to a segment template that follows MPEG DASH specifications, the way to list available segments is done through a directive tagged by <SegmentTemplate>, wherein a rule is given for naming initialisation segments and A/V content segments. Each representation is associated with an initialization segment, typically encapsulated in a mp4 file, and a plurality of A/V content segments, typically encapsulated into ms4 files. In addition, the segment template includes a timeline of the listed available segments. As described earlier, the rewritten secondary A/V content manifest (right column) shows a timeline that is harmonized with respect to the indication of typical duration (6 segments of 2 seconds (segments 0 to 5 with d="180000") and 1 segment of 1 second (segment 6 with d="90000")). The timeline at the top of FIG. 1 (identified by the tag <SegmentTimeline> in the left column of the example above) is thus modified to become the timeline at the bottom of FIG. 1 (identified by the tag <SegmentTimeline> in the right column of the example above).

Since, the timeline is modified, the original secondary A/V content segments (corresponding to a bandwidth of 8 Mbps and resolution of 1280×720) need to be later on transcoded to match this modified timeline and consequently the description of this representation needs to be modified in the secondary A/V content manifest. In the case where the original ad manifest describes a plurality of representations, all these descriptions need to be modified to match the new timeline.

In a step S204-2, the transcoding proxy 112 thus modifies the description of the representation(s) (defined in our example by: bandwidth="8000000" codecs="avc1.4d0020" width="1920" height="1080") present in the original secondary A/V content manifest. The transcoding proxy 112 indicates therein that a transcoding of the original secondary A/V content is requested to match the rewritten segments timeline. The description of the representation(s) is then modified through updating the <Representation id> field that is part of the segment template, gathering the keyword "Jitt" (standing for "Just In Time Transcoding"), meaning that the related representation does not exist in the specified timeline, followed by the targeted bitrate and resolution. In addition, the <Representation id> field gathers the key "srcvideo" indicating which source representation shall be used to perform the transcoding operation in order to obtain the representation in question described in the rewritten secondary A/V content manifest. In the example above, the source representation is identified by its bandwidth parameter, as indicated with the "bandwidth" field in the <Representation> element of the original secondary A/V content manifest.

Optionally, in a step S204-3, the transcoding proxy 112 further adds a description of additional representation(s) as specified in the configuration parameters of the request (the one corresponding to bandwidth="1000000" codecs="avc1.4d0020" width="1280" height="720" in the example above). The secondary A/V content segments associated with this additional representation(s) shall also be later on obtained by transcoding. Here again, the key/value pair "Jitt", accompanied by the key/value pair "srcvideo", are used to indicate that transcoding operations have to be performed later on, in order to obtain the new representation according to the rewritten timeline.

The above embodiment disclosed with respect to MPEG-DASH may also apply to other A/V delivery formats, such as HLS, which specifies usage of two levels of manifest, also referred to as "playlists" in the HLS terminology: the master playlist (also referred to as "multivariant playlist"), which lists available representation(s), and the variant playlist(s), which lists segments per representation. Therefore, each variant playlist present in the original A/V secondary content manifest shall be modified according to the typical duration to be applied. Moreover, when at least one new representation shall be added, the master playlist shall be modified in accordance and at least one new variant playlist shall be respectively added in accordance to the at least one new representation. Here below is shown an HLS-compatible version of the example of FIG. 1:

| Master playlist of the original secondary A/V content manifest | Master playlist of the rewritten secondary A/V content manifest |
|---|---|
| #EXTM3U<br>#EXT-X-VERSION:7<br>#EXT-X-STREAM-INF:BANDWIDTH=8000000,CLOSED-CAPTIONS=NONE,CODECS="avc1.640028",RESOLUTION=1920x1080<br>video=8000000.m3u8 | #EXTM3U<br>#EXT-X-VERSION:7<br>#EXT-X-STREAM-INF:BANDWIDTH=8000000,CLOSED-CAPTIONS=NONE,CODECS="avc1.640028",RESOLUTION=1920x1080<br>video=8000000.m3u8?jitt=8000000-1920x1080&normalized<br>#EXT-X-STREAM-INF:BANDWIDTH=1000000,CLOSED-CAPTIONS=NONE,CODECS="avc1.640028",RESOLUTION=1280x720<br>video=8000000.m3u8?jitt=1000000-1280x720&normalized |
| **Variant playlist of the original secondary A/V content manifest** | **Same variant playlist of the rewritten secondary A/V content manifest** |
| #EXTM3U<br>#EXT-X-VERSION:7<br>#EXT-X-PLAYLIST-TYPE:VOD<br>#EXT-X-MEDIA-SEQUENCE:1<br>#EXT-X-INDEPENDENT-SEGMENTS<br>#EXT-X-TARGETDURATION:6<br>#EXT-X-MAP:URI="hls/video=8000000.mp4"<br>#EXTINF:4.00,no desc<br>hls/video=8000000-1.m4s<br>#EXTINF:2.00,no desc<br>hls/video=8000000-2.m4s<br>#EXTINF:1.00,no desc<br>hls/video=8000000-3.m4s<br>#EXTINF:6.00,no desc<br>hls/video=8000000-4.m4s<br>#EXT-X-ENDLIST | #EXTM3U<br>#EXT-X-VERSION:7<br>#EXT-X-PLAYLIST-TYPE:VOD<br>#EXT-X-MEDIA-SEQUENCE:1<br>#EXT-X-INDEPENDENT-SEGMENTS<br>#EXT-X-TARGETDURATION:2<br>#EXT-X-MAP:URI="hls/normalized_video=8000000.m3u8/jitt=8000000-1920x1080.mp4"<br>#EXTINF:2.00,no desc<br>hls/normalized_video=8000000.m3u8/jitt=8000000-1920x1080-0-2.m4s?original_segments=1<br>#EXTINF:2.00,no desc<br>hls/normalized_video=8000000.m3u8/jitt=8000000-1920x1080-2-4.m4s?original_segments=1<br>#EXTINF:2.00,no desc<br>hls/normalized_video=8000000.m3u8/jitt=8000000-1920x1080-4-6.m4s?original_segments=2<br>#EXTINF:2.00,no desc<br>hls/normalized_video=8000000.m3u8/jitt=8000000-1920x1080-6-8.m4s?original_segments=3,4<br>#EXTINF:2.00,no desc<br>hls/normalized_video=8000000.m3u8/jitt=8000000-1920x1080-8-10.m4s?original_segments=4<br>#EXTINF:2.00,no desc<br>hls/normalized_video=8000000.m3u8/jitt=8000000-1920x1080-10-12.m4s?original_segments=4<br>#EXTINF:1.00,no desc<br>hls/normalized_video=8000000.m3u8jitt=8000000-1920x1080-12-13.m4s?original_segments=4<br>#EXT-X-ENDLIST |
| | **New Variant playlist of the rewritten secondary A/V content manifest** |
| | #EXTM3U<br>#EXT-X-VERSION:7<br>#EXT-X-PLAYLIST-TYPE:VOD<br>#EXT-X-MEDIA-SEQUENCE:1<br>#EXT-X-INDEPENDENT-SEGMENTS<br>#EXT-X-TARGETDURATION:2<br>#EXT-X-MAP:URI="hls/normalized_video=8000000.m3u8/jitt=1000000-1280x720.mp4"<br>#EXTINF:2.00,no desc<br>hls/normalized_video=8000000.m3u8/jitt=1000000-1280x720-0-2.m4s?original_segments=1<br>#EXTINF:2.00,no desc<br>hls/normalized_video=8000000.m3u8/jitt=1000000-1280x720-2-4.m4s?original_segments=1<br>#EXTINF:2.00,no desc<br>hls/normalized_video=8000000.m3u8/jitt=1000000-1280x720-4-6.m4s?original_segments=2 |

-continued

```
#EXTINF:2.00,no desc
hls/normalized_video=8000000.m3u8/jitt=10
00000-1280x720-6-
8.m4s?original_segments=3,4
#EXTINF:2.00,no desc
hls/normalized_video=8000000.m3u8/jitt=10
00000-1280x720-8-
10.m4s?original_segments=4
#EXTINF:2.00,no desc
hls/normalized_video=8000000.m3u8/jitt=10
00000-1280x720-10-
12.m4s?original_segments=4
#EXTINF:1.00,no desc
hls/normalized_video=8000000.m3u8jitt=100
0000-1280x720-12-
13.m4s?original_segments=4
#EXT-X-ENDLIST
```

In contrast to MPEG DASH, segments descriptions cannot be templated in HLS playlists and thus description of all segments is provided. In the variant playlists, all information indicating a normalized and transcoded segment is encoded directly in the description for a transcoded and normalized segment, including the duration of each segment (with the tag #EXTINF, followed by the duration in seconds) as well as the original secondary A/V content segments needed to perform the transcoding.

For example, for the fourth segment of 2 seconds according to the rewritten timeline, it is specified hls/normalized_video=8000000.m3u8/jitt=8000000-1920×1080-6-8.m4 s?original_segments=3,4, which informs the transcoding proxy 112 that this fourth segment may be generated from original third and fourth segments as listed in the original variant playlist "video-8000000.m3u8", by transcoding and further trimming between timestamps of 6 and 8 seconds.

The "normalized" keyword is present in the master playlist and in each variant playlist, with the same consequences as in the example based on MPEG DASH. In the master playlist, it makes the transcoding proxy 112 retrieve the original variant playlist and to generate the target variant playlist. With the latter, the "normalized" keyword (as part of the segment URL) informs the transcoding proxy 112 that it must generate the segment from one or more original segments according to the transcoding operations.

In a step S206, the transcoding proxy 112 transmits the rewritten secondary A/V content manifest to the A/V delivery platform 102.

Figure 4A:
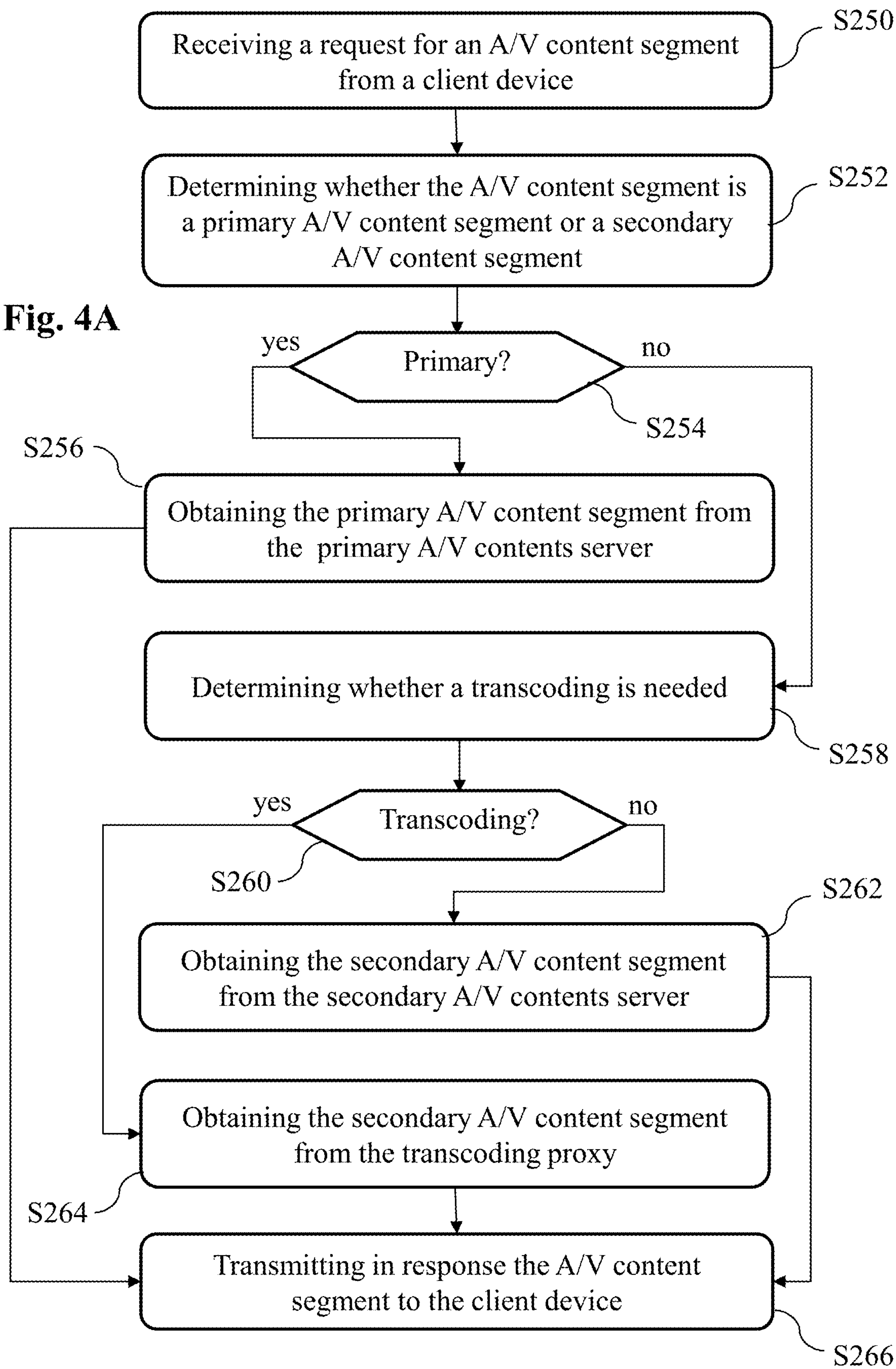
FIG. 4A represents a flowchart of a method for obtaining appropriate A/V content data upon receiving a request, coming from a client device, for obtaining an A/V content segment, according to a particular embodiment.

FIG. 4A represents a flowchart of a method for obtaining appropriate A/V content data upon receiving a request, coming from a client device, for obtaining an A/V content segment. The algorithm of FIG. 4A is implemented by the CDN 108 (equipment thereof) or the A/V delivery platform 102.

In a step S250, the CDN 108 or the A/V delivery platform 102 receives a request from the client device 110 during streaming operations. The request indicates that the client device 102 requests obtaining an A/V content segment. The request has been built by the client device 110 according to the manifest previously provided to the client device 110 and further according to the representation suitable for the client device 110. Therefore, the request may target a primary A/V content segment, or a secondary A/V content segment that does not need to be transcoded, or a secondary A/V content segment that needs to be transcoded.

In a step S252, the CDN 108 or the A/V delivery platform 102 determines whether the request concerns a segment of the primary A/V content or a segment of the secondary A/V content.

In a step S254, the CDN 108 or the A/V delivery platform 102 selects an appropriate further action according to whether the request concerns a segment of the primary A/V content or a segment of the secondary A/V content. When the request concerns a segment of the primary A/V content, a step S256 is performed; otherwise, a step S258 is performed.

In the step S256, the CDN 108 or the A/V delivery platform 102 obtains the primary A/V content segment in question from the primary A/V contents server 106. And then a step S266 is performed.

In the step S258, the CDN 108 or the A/V delivery platform 102 determines whether the request concerns a segment of the secondary A/V content that does not need to be transcoded or a segment of the secondary A/V content that needs to be transcoded. As explained below, the rewritten manifest indicates whether transcoding is needed (using the keyword "normalized" in the example above).

In a step S260, the CDN 108 or the A/V delivery platform 102 selects an appropriate further action according to whether the request concerns a segment of the secondary A/V content that does not need to be transcoded or a segment of the secondary A/V content that needs to be transcoded. When the request concerns a segment of the secondary A/V content that does not need to be transcoded, a step S262 is performed; otherwise, a step S264 is performed.

In the step S262, the CDN 108 or the A/V delivery platform 102 obtains the secondary A/V content segment in question from the secondary A/V contents server 114. And then the step S266 is performed.

In the step S264, the CDN 108 or the A/V delivery platform 102 obtains the secondary A/V content segment in question from the transcoding proxy 112. To do so, the A/V delivery platform 102 forwards to the transcoding proxy 112 the request received in the step S250. The transcoding proxy 112 consequently manages appropriate transcoding operations, as detailed hereafter with respect to FIG. 4B. And then the step S266 is performed.

In the step S264, the CDN 108 or the A/V delivery platform 102 transmits, in response to the request received from the client device 110 in the step S250, the A/V content segment obtained in the step S256, or in step S262, or in the step S264, whichever applies.

Figure 4B:
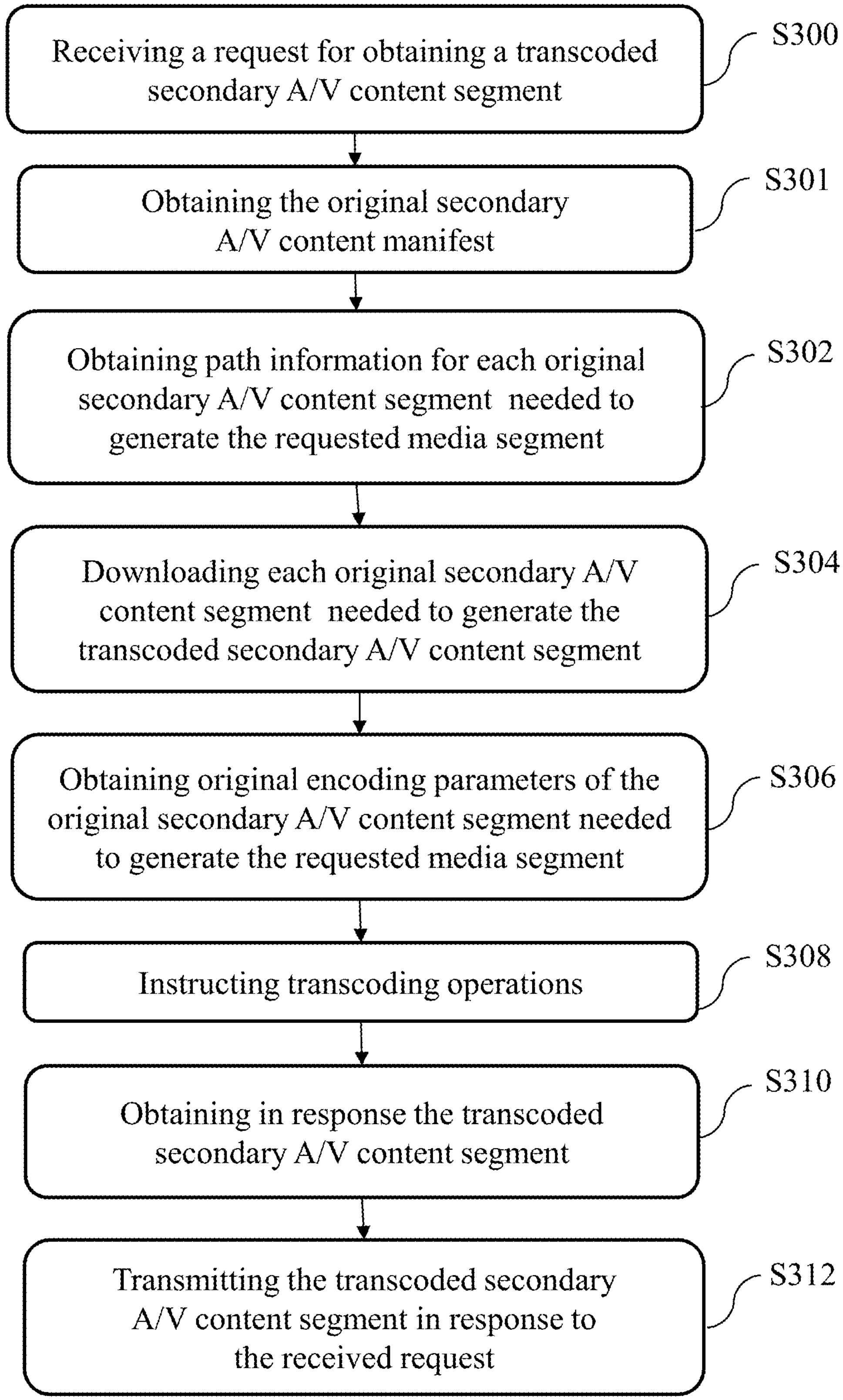
FIG. 4B schematically represents a flowchart of a method for transcoding segments, according to a particular embodiment.

FIG. 4B represents a flowchart of a method for transcoding secondary A/V content data so as to provide a secondary A/V content segment, according to a particular embodiment. Here again, the algorithm of FIG. 4B is advantageously implemented by the transcoding proxy 112 acting as a stateless transcoding proxy server.

In a step S300, the transcoding proxy 112 receives, from the CDN 108 (equipment thereof) or the A/V delivery platform 102, a request for providing a transcoded secondary A/V segment. The request comprises information contained or derived from the rewritten manifest file previously transmitted to the client device 110. More precisely, the request includes a description of a requested segment which takes up transcoding information that was provided by the transcoding proxy 112 to build the rewritten manifest. Namely, with the example already disclosed above in case of MPEG-DASH, the request includes the following information:

normalized_<link-to-original-mpd>_<target-duration>/jitt=<target bandwidth>-<target resolution>-srcvideo=<source representation bandwidth>-<timestamp>.m4 s.

wherein:

- <link-to-original-mpd> provides a path to obtain the original secondary A/V content manifest;
- <target-duration> indicates the typical duration to be applied for obtaining the transcoded secondary A/V content segment;
- <target bandwidth> indicates bandwidth information corresponding to the transcoded secondary A/V content segment that is requested, such as "1000000";
- <target resolution> indicates resolution information corresponding to the transcoded secondary A/V content segment that is requested, such as "1280×720";
- <source representation bandwidth> indicates bandwidth information corresponding to the original secondary A/V content segment(s) to be used for transcoding, such as "8000000";
- <timestamp> indicates which segment of the transcoded secondary A/V content is requested according to the rewritten timeline, here with a timestamp information. As an example, for the fifth segment of the rewritten timeline at the bottom of FIG. 1, the timestamp information is equal to 8 (in seconds).

And with the example already disclosed above in case of HLS, the request includes the following information:

hls/normalized_<link-to-original-media-playlist>/jitt=<target bandwidth>-<target resolution>-<start timestamp>-<stop timestamp>.m4 s?original_segments=<list-segment-indexes>.

wherein in the illustrative example above <link-to-original-media-playlist> (which is equivalent to <link-to-original-mpd> in the DASH-compliant example) is simply "video=8000000.m3u8".

One may note that, by convention with HLS, the segment description includes the start timestamp information and stop timestamp information (start timestamp> and <stop timestamp>) in contrast with MPEG DASH compatible format wherein the segment duration is indicated, as well as index(es) of the needed original secondary A/V content segment(s).

In a step S301, the transcoding proxy 112 obtains the original secondary A/V content manifest. Indeed, under a stateless approach, the transcoding proxy 112 does not keep trace of the original secondary A/V content manifest upon which the rewritten secondary A/V content manifest has been generated. Thus, the transcoding proxy 112 needs to obtain the original secondary A/V content manifest each time transcoding operations have to be performed. Path to the original secondary A/V content manifest is provided in the request received in the step S300, more especially where <link-to-original-mpd> (or <link-to-original-media-playlist> for HLS) is stated.

In a step S302, the transcoding proxy 112 determines which at least one original secondary A/V content segment has to be used to perform transcoding operations in order to be able to generate the transcoded secondary A/V content segment that is requested. From the original secondary A/V content manifest obtained in the step S301, the transcoding proxy 112 retrieves a path to obtain the at least one original secondary A/V content segment to be used to perform the transcoding operations.

Figure 5:
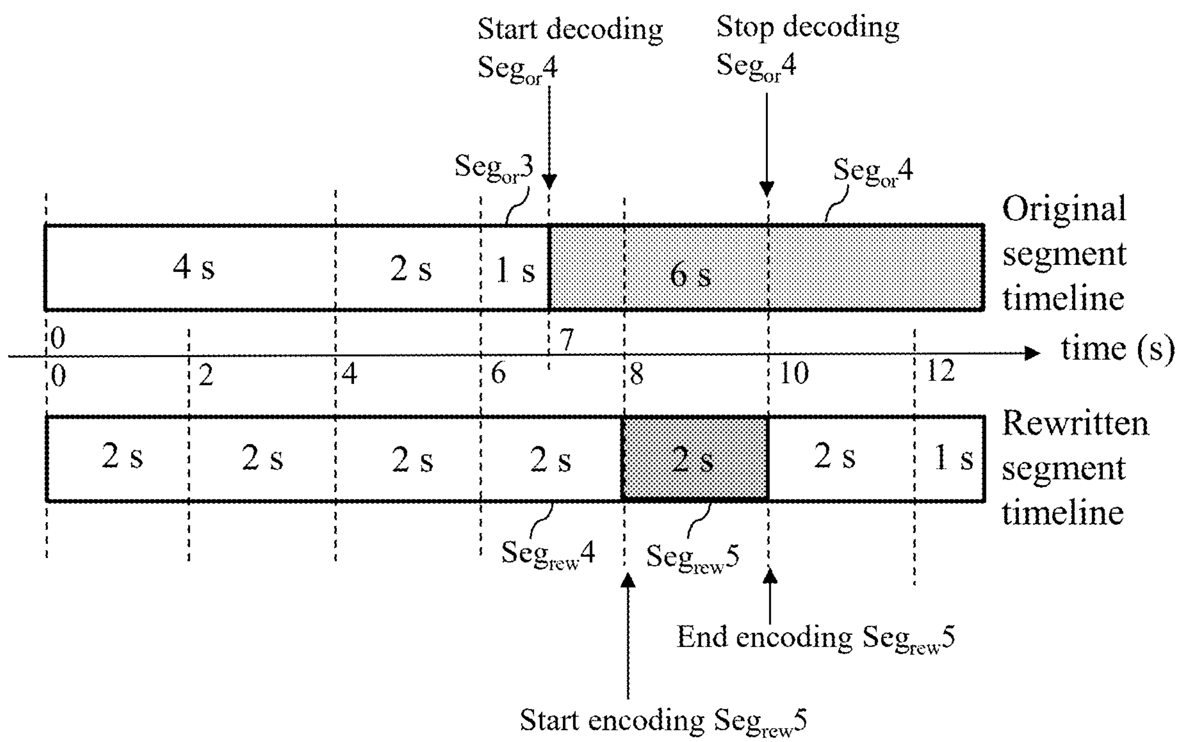
FIG. 5 schematically represents an original ad segment timeline with 4 segments of various durations and a corresponding rewritten timeline.

As an example, illustrated on FIG. 5, in order to generate the fifth segment $Seg_{rew}5$ (grey segment on the bottom of FIG. 5) according to the rewritten timeline, the fourth segment $Seg_{or}4$ (grey segment in the bottom of FIG. 5) according to the original timeline is needed.

Some transcoded secondary A/V content segments may require more than one original secondary A/V content segment to be obtained. Thus, as another example, in order to generate the fourth segment $Seg_{rew}4$ according to the rewritten timeline (see FIG. 5), the third and fourth segments ($Seg_{or}3$ and $Seg_{or}4$) according to the original timeline are needed.

In the case of MPEG DASH, the transcoding proxy 112 determines the original secondary A/V content segment(s) needed to generate the requested transcoded secondary A/V content segment, according to the <timestamp> information of the received request, the typical duration as expressed by the <target-duration> information. The transcoding proxy 112 computes the start and stop encoding timestamps to be used for trimming after transcoding as follows:

start encoding timestamp=<timestamp> stop encoding timestamp>=<timestamp>+<target-duration>

The transcoding proxy 112 then determines the original A/V secondary content segments to be used, as follows:

- start timestamp, which represents the start of decoding of the original A/V secondary content, is a segment boundary less than or equal to <start encoding timestamp>, and
- end timestamp, which represents the stop of decoding of the original A/V secondary content, is a segment boundary greater than or equal to <stop encoding timestamp>

In the case of HLS, the step S302 is simplified since the needed original secondary A/V content segment(s) may be retrieved directly from <list-segment-indexes>.

Back to FIG. 3, in a step S304, the transcoding proxy 112 downloads the original secondary A/V content segment(s), which are needed to generate the requested transcoded secondary A/V content segment, from the secondary A/V contents server 116, and when several original secondary A/V content segments are needed, the transcoding proxy 112 concatenates them so as to prepare decoding.

In a step S306, the transcoding proxy 112 obtains original encoding parameters that were used to encode the original A/V content segments needed to generate the requested transcoded secondary A/V content segment. To this aim, the transcoding proxy 112 downloads the initialization segment corresponding to the original A/V content segments needed to generate the requested transcoded secondary A/V content segment. The initialization segment includes adequate parameters to configure a decoder for decoding the A/V content segments with which said initialization segment is associated (the initialization segment is initially intended for configuring client devices' players). Path to download the initialization segment is indicated in the segment template of the original secondary A/V content manifest in association with the key "initialization".

Once downloaded, the transcoding proxy 112 prepends the initialization segment to the downloaded original secondary A/V content segment(s).

In a step S308, the transcoding proxy 112 instructs transcoding of the original secondary A/V content segment(s) so as to obtain the requested transcoded secondary A/V content segment. To this aim, the transcoding proxy 112 sends a transcoding request to the transcoder 116, said request comprising the initialization segment followed by the downloaded original secondary A/V content segment(s) with targeted encoding parameters indicating where to start and stop transcoding, resolution and/or bandwidth. The transcoding request may further include as information about codec to be used, if not implicit.

The transcoder 116 performs the transcoding operations according to the received encoding parameters and transmits the resulting requested secondary A/V content segment to the transcoding proxy 112, which receives said requested secondary A/V content segment in a step S310.

Thanks to the presence of the initialization segment, the transcoder 116 is able to configure a decoder function for decoding the original secondary A/V content segment(s). From the decoded original secondary A/V content segments and by applying the encoding parameters, namely the targeted resolution and/or bandwidth, the transcoder 116 is able to reencode/generate the requested transcoded secondary A/V segment. The transcoder 116 starts decoding the original secondary A/V content segment from 0 s (relative timestamp) and starts encoding samples for the transcoded secondary A/V content segment once the start encoding timestamp expected for the requested transcoded secondary A/V content segment is reached. Once the stop encoding timestamp expected for the requested transcoded secondary A/V content segment is reached, the requested transcoded secondary A/V content segment is fully generated.

In a step S312, the transcoding proxy 112 transmits the transcoded secondary A/V content segment to the requester being either the CDN 108 (equipment thereof) or the A/V delivery platform 102, which in turn transmits it to the client device 110.

Figure 6:
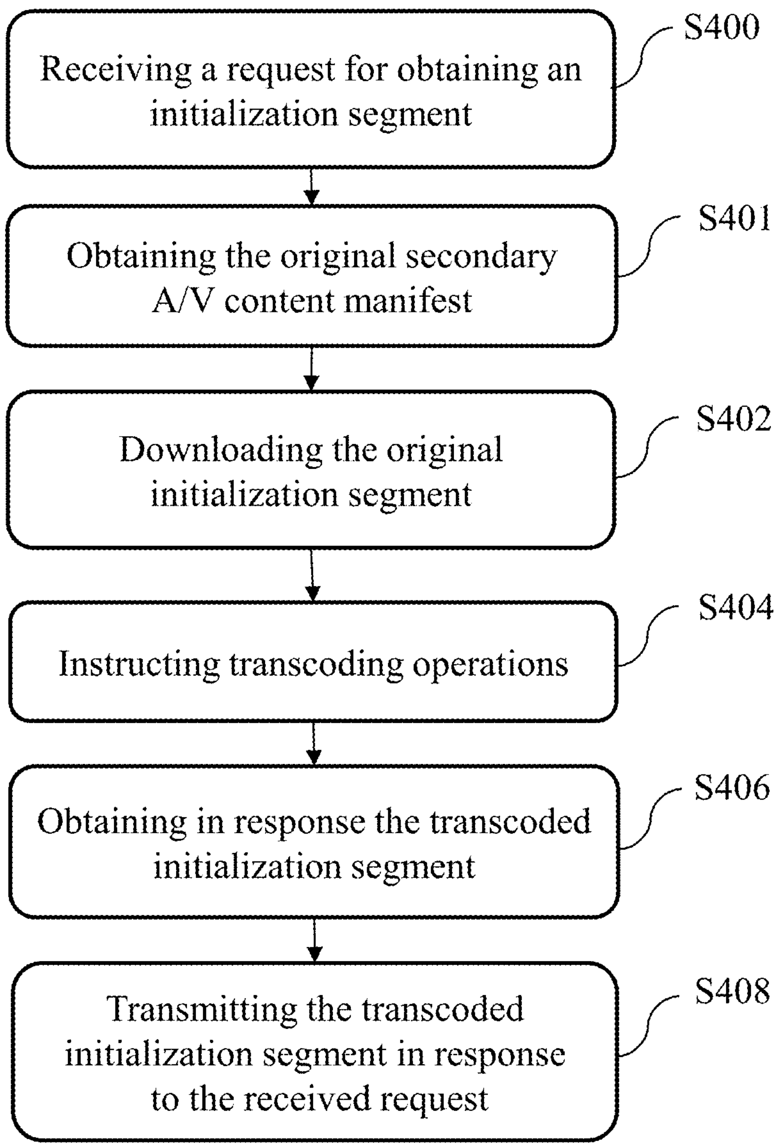
FIG. 6 schematically represents a flowchart of a method for generating the initialization segment to be associated with the transcoded media segment according to a particular embodiment.

FIG. 6 represents a flowchart of a method for generating an initialization segment to be associated with transcoded secondary A/V content segments, according to a particular embodiment. Indeed, in order to be able to play transcoded secondary A/V content segments, the client device 110 needs to know the encoding parameters used to generate the transcoded secondary A/V content segments in question. These encoding parameters are encapsulated in the so-called initialization segment, thus enabling configuring the player of the client device 110.

The request has been built by the client device 110 according to the manifest previously provided to the client device 110 and further according to the representation suitable for the client device 110. Therefore, the request may target an initialization segment to be used for decoding primary A/V content segments, or an initialization segment to be used for decoding secondary A/V content segments without transcoding, or an initialization segment to be used for decoding secondary A/V content segments with transcoding.

From the standpoint of the A/V delivery platform 102, the initialization segment is a particular case of A/V contents data. Therefore, when receiving a request from the client device 110 for obtaining an initialization segment, the same method as disclosed above with respect to FIG. 4A applies. Thus, the flowchart of FIG. 6 starts when the CDN 108 (equipment thereof) or the A/V delivery platform 102 has detected that the request from the client device 110 relates to obtaining an initialization segment to be used for decoding secondary A/V content segments with transcoding and when the CDN 108 or the A/V delivery platform 102 has forwarded the request to the transcoding proxy 112.

In a step S400, the transcoding proxy 112 receives, from the CDN 108 or the A/V delivery platform 102, the request for obtaining an initialization segment. The request comprises information contained or derived from the rewritten manifest file previously transmitted to the client device 110. More precisely, the request includes a description of a requested initialization segment which takes up transcoding information that was provided by the transcoding proxy 112 to build the rewritten manifest. Namely, with the example already disclosed above in case of MPEG-DASH, the request includes the following information:

normalized_<link-to-original-mpd>_<target-duration>/jitt=<target bandwidth>-<target resolution>-srcvideo=<source representation bandwidth>.m4 s.

And with the example already disclosed above in case of HLS, the request includes the following information:

hls/normalized_<link-to-original-media-playlist>/jitt=<target bandwidth>-<target resolution>.mp4

In a step S401, the transcoding proxy 112 obtains the original secondary A/V content manifest. Indeed, as already stated, under a stateless approach, the transcoding proxy 112 does not keep trace of the original secondary A/V content manifest upon which the rewritten secondary A/V content manifest has been generated. Thus, the transcoding proxy 112 needs to obtain the original secondary A/V content manifest each time transcoding operations have to be performed, including when they relate to initialization segments. Path to the original secondary A/V content manifest is provided in the request received in the step S400, more especially where <link-to-original-mpd> (or <link-to-original-media-playlist> for HLS) is stated.

In a step S402, from the original secondary A/V content manifest obtained in the step S401, the transcoding proxy 112 retrieves a path to obtain an initialization segment of the original secondary A/V content. The initialization segment in question corresponds to the segments of the original secondary A/V content used (or to be used) to obtain the transcoded secondary A/V content segments to which the requested initialization segment applies. Namely, with the example above with MPEG DASH, the initialization segment of the original secondary A/V content to be obtained is identified by the value in place of <source representation bandwidth>. Path to download the initialization segment is indicated in the segment template of the original secondary A/V content manifest in association with the key "initialization". And in the example with HLS, <link-to-original-media-playlist> already points out to the appropriate representation, as already explained. Thus, in the step S402, the transcoding proxy 112 downloads the appropriate initialization segment of the original secondary A/V content.

In a step S404, the transcoding proxy 112 instructs transcoding of the obtained initialization segment of the original secondary A/V content so as to obtain the requested initialization segment adapted for a target representation identified in the request received in the step S400 (i.e., by <target bandwidth> and <target resolution> in the example above). To this aim, the transcoding proxy 112 sends a transcoding request to the transcoder 116, said request comprising the obtained initialization segment of the original secondary A/V content accompanied with targeted encoding parameters of resolution and/or bandwidth. The transcoding request may further include information about applicable codec, if not implicit.

The transcoder 116 performs the transcoding operations according to the received encoding parameters and transmits the resulting requested initialization segment to the transcoding proxy 112, which receives the requested initialization segment in a step S406.

In a step S408, the transcoding proxy 112 transmits the requested initialization segment to the A/V delivery platform 102, which in turn transmits it to the client device 110.

Figure 7:
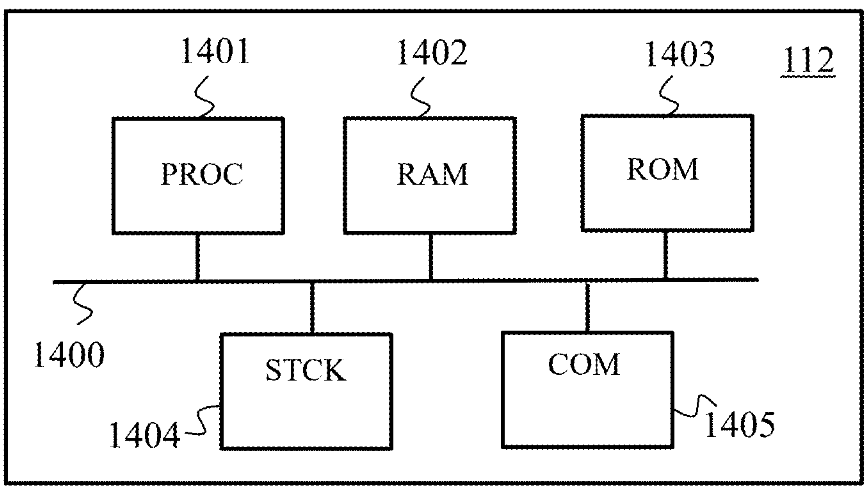
FIG. 7 schematically illustrates an example of hardware architecture of a transcoding proxy according to a particular embodiment.

FIG. 7 schematically illustrates an example of hardware architecture of a transcoding proxy 112, according to a particular embodiment. The example of hardware architecture also applies to the A/V delivery platform 112. The example of hardware architecture may also apply to the transcoder 116.

The transcoding proxy 112 comprises, connected by a communication bus 1400: a processor or CPU (standing for "Central Processing Unit") 1401; a RAM (standing for "Random Access Memory") 1402; a ROM (standing for "Read Only Memory") 1403; a storage unit 1404, namely a non-transitory storage medium, such as an HDD (standing for "Hard Disk Drive") or such as a storage medium reader, e.g., an SD (standing for "Secure Digital") card reader accompanied with an SD card; and at least one set of communication interfaces COM 1405 enabling the transcoding proxy 112 to communicate in the A/V content delivery system 100.

The processor 1401 is capable of executing instructions loaded into the RAM 1402 from the ROM 1403, from an external memory (such as the aforementioned SD card or HDD), or from a communication network. When the transcoding proxy 112 is powered up, the processor 1401 is capable of reading instructions from the RAM 1402 and executing them. These instructions form a computer program causing implementation, by the processor 1401, of the steps and methods described herein with respect to the transcoding proxy 112.

The steps and methods described herein may be implemented in software form by the execution of the set of instructions by a programmable machine, for example a DSP (standing for "Digital Signal Processor"), a microcontroller or a GPU (standing for "Graphics Processing Unit"), or be implemented in hardware form by a machine or a dedicated chip or chipset, for example an FPGA (standing for "Field-Programmable Gate Array") or an ASIC (standing for "Application-Specific Integrated Circuit"). In general terms, the transcoding proxy 112, the transcoder 116, and the A/V delivery platform 102 include electronic circuitry adapted and configured for implementing the steps and methods described herein.

The invention claimed is:

1. A method for delivering an audio and/or video A/V content to a client device using adaptive streaming by an A/V content delivery system, the A/V content comprising a primary A/V content and a secondary A/V content to be inserted in the primary A/V content, the primary A/V content and the secondary A/V content being in a form of segments, the method being implemented by a transcoding proxy of the A/V content delivery system, wherein the method comprises:

receiving a first request for preparing to transcode segments of the secondary A/V content, when the segments of the secondary A/V content have different duration than a typical duration of the segments of the primary A/V content, the first request including locator information about an original secondary A/V content manifest along with configuration parameters, said configuration parameters comprising the typical duration of the segments of the primary A/V content;

obtaining said original secondary A/V content manifest using the locator information about the original secondary A/V content manifest, which describes an original secondary A/V content segments timeline and at least one available representation of original secondary A/V content associated with said original secondary A/V content segments timeline;

rewriting said original secondary A/V content manifest, so as to obtain a rewritten secondary A/V content manifest, by indicating, in a part thereof intended to be reused by the client device to request segments of the secondary A/V content, that transcoding is requested as well as the typical duration of the segments of the primary A/V content, and by modifying the description of said at least one representation so as to match a rewritten timeline obtained by rewriting the original secondary A/V content segments timeline responsive to the received configuration parameters so that the rewritten segment timeline is aligned on the typical duration of the segments of the primary A/V content;

transmitting the rewritten secondary A/V content manifest in response to the first request;

and when receiving a second request for at least one segment of the secondary A/V content according to the rewritten secondary A/V content manifest, instructing a transcoder to perform transcoding operations so as to obtain, and further transmit in response to the second request, segments of the secondary A/V content according to the rewritten timeline.

2. The method according to claim 1, wherein said configuration parameters further comprise information about at least one representation to be made available for the secondary A/V content and wherein modifying said original secondary A/V content manifest further comprises adding a description of said at least one new representation indicating that transcoding is requested to match the rewritten timeline.

3. The method according to claim 1, wherein said adaptive streaming is compliant with Motion Picture Expert Group Dynamic Adaptive Streaming over Hypertext transfer protocol MPEG DASH, the second request includes a timestamp information <timestamp> indicating one segment of the secondary A/V content to be obtained, and wherein performing the transcoding operations comprises:

computing start and stop encoding timestamps as:

<start encoding timestamp>=<timestamp>

<stop encoding timestamp>=<timestamp>+<target-duration> determining at least one original A/V secondary content segment to be used in the transcoding operation, as:

start timestamp, which represents a start of decoding of the original A/V secondary content, and which is a segment boundary less than or equal to <start encoding timestamp>, and end timestamp, which represents a stop of decoding of the original A/V secondary content, and which is a segment boundary greater than or equal to <stop encoding timestamp> downloading each original A/V secondary content segment between start timestamp and end timestamp, and performing decoding segments between start timestamp and end timestamp;

reencoding one segment between start encoding timestamp and stop encoding timestamp; and transmitting the reencoded segment in response to the second request.

4. The method according to claim 1, wherein said adaptive streaming is compliant with Hypertext transfer protocol Live Streaming HLS, the second request includes identification of at least one segment of the secondary A/V content according to the original secondary A/V content segments timeline which is needed to obtain the at least one segment of the secondary A/V content as requested by the second request.

5. The method according to claim 1, wherein rewriting said original secondary A/V content manifest further comprises adding in the rewritten secondary A/V content manifest, in the part thereof intended to be reused by the client device to request segments of the secondary A/V content, the locator information about the original secondary A/V content manifest, and wherein when receiving the second request, the transcoding proxy retrieves the information about the original secondary A/V content using the original secondary A/V content manifest pointed by said locator information.

6. The method according to claim 1, wherein delivering segments of the A/V content to the client device is performed by an A/V delivery platform, and wherein the A/V delivery platform performs:

retrieving, from a primary A/V contents server that provides the primary A/V content, an original primary A/V content manifest;

detecting that the primary A/V content has to be complemented by insertion of the secondary A/V content thanks to specific markers in the original primary A/V content manifest;

sending the first request to the transcoding proxy; and modifying the original primary A/V content manifest using the rewritten secondary A/V content manifest so as to obtain a rewritten primary A/V content manifest including information for inserting the secondary A/V content;

transmitting the rewritten primary A/V content manifest to the client device in response to a request for obtaining the original primary A/V content manifest.

7. The method according to claim 6, wherein the second request is transmitted by the A/V delivery platform or by equipment of a Content Delivery Network CDN via which the A/V delivery platform delivers the A/V content to the client device.

8. The method according to claim 7, wherein the A/V delivery platform or said equipment of the CDN performs:

receiving from the client device a request for obtaining a segment of the A/V content;

determining whether the segment in question is a primary A/V content segment or a secondary A/V content segment;

when the segment in question is a primary A/V content segment, obtaining the segment in question from the primary A/V contents server;

when the segment in question is a secondary A/V content segment that does not need transcoding, obtaining the segment in question from a secondary A/V contents server; and when the segment in question is a secondary A/V content segment that does not need transcoding, sending the second request to the transcoding proxy.

9. A transcoding proxy intended to be used in an audio and/or video A/V content delivery system for delivering an A/V content to a client device using adaptive streaming, the A/V content comprising a primary A/V content and a secondary A/V content to be inserted in the primary A/V content, the primary A/V content and the secondary A/V content being in a form of segments, the transcoding proxy comprising electronic circuitry configured to perform:

receiving a first request for preparing to transcode segments of the secondary A/V content, when the segments of the secondary A/V content have different duration than a typical duration of the segments of the primary A/V content, the first request including locator information about an original secondary A/V content manifest along with configuration parameters, said configuration parameters comprising the typical duration of the segments of the primary A/V content;

obtaining said secondary A/V content original manifest using the locator information about the original secondary A/V content manifest, which describes an original secondary A/V content segments timeline and at least one available representation of said original secondary A/V content associated with said original secondary A/V content segments timeline;

rewriting said original secondary A/V content manifest, so as to obtain a rewritten secondary A/V content manifest, by indicating, in a part thereof intended to be reused by the client device to request segments of the secondary A/V content, that transcoding is requested as well as the typical duration of the segments of the primary A/V content; and by modifying the description of said at least one representation so as to match a rewritten timeline obtained by rewriting the original secondary A/V content segments timeline responsive to the received configuration parameters so that the rewritten segment timeline is aligned on the typical duration of the segments of the primary A/V content;

transmitting the rewritten secondary A/V content manifest in response to the first request;

and when receiving a second request for at least one segment of the secondary A/V content according to the rewritten secondary A/V content manifest, instructing a transcoder to perform transcoding operations so as to obtain, and further transmit in response to the second request, segments of the secondary A/V content according to the rewritten timeline.

10. An audio and/or video content delivery system comprising a Content Delivery Network CDN via which audio and/or video contents are delivered to client devices, further comprising the transcoding proxy according to claim 9.

11. A non-transitory storage medium storing instructions causing implementation of the method according to claim 1, when the instructions are read from the storage medium and executed by a processor.

* * * * *